3,305,603
METHOD OF IMPROVING ACID DYEABILITY OF FIBRE-FORMING POLYMERS
James Eric McIntyre and Michael King McCreath, Harrogate, England, assignors to Imperial Chemical Industries Limited, London, England, a corporation of Great Britain
No Drawing. Filed Sept. 14, 1964, Ser. No. 396,372
Claims priority, application Great Britain, Sept. 23, 1963, 37,350/63
9 Claims. (Cl. 260—860)

This invention relates to a method of improving the acid-dyeability of fibre-forming polymers, particularly of polyesters based on terephthalic acid.

Hydrophobic polymers which do not contain basic groups do not readily dye with dyes containing sulphonic acid groups, such as dyestuffs of the classes commonly referred to as acid wool dyes, direct cotton dyes, and soluble reactive dyes. In some cases it is possible to incorporate basic groups while making the polymer or while shaping it, for example when spinning it to fibres. In some cases, however, this technique for improving acid-dyeability is not available because extensive degradation of the polymer is caused by the basic groups. The most important example of this class of polymer is poly(ethylene terephthalate).

Several suggestions for improving the acid-dyeability of poly(ethylene terephthalate) have been put forward. Thus secondary and tertiary amines have been incorporated by reacting pre-formed polyester with an alkanolamine; benziminazole groups have been incorporated; and co-polymers of poly(ethylene terephthalate) with compounds containing imide groups can be reacted with hydrazine or ethylenediamine to form free amine groups, which confer acid-dyeability on the fibre.

None of the methods of obtaining acid-dyeability which have been suggested so far have proved suitable for use commercially.

We have now found that synthetic fibre-forming polymers, such as polyesters, for instance poly(ethylene terephthalate), and isotactic polymerised olefines, for instance isotactic polypropylene, can be rendered dyeable with acid dyestuffs by incorporating within the polymer an ester of trichloroacetic or oxalic acid, followed by treating the polymer with a compound containing at least one basic —NH— group, such as ammonia, hydrazine, an amine, or a polyamine.

According to our invention, therefore, we provide a film or fibre-forming synthetic polymer in the form of a shaped article which has been formed by an extrusion technique, said synthetic linear polymer article having incorporated therein at least one ester selected from esters of trichloroacetic acid and oxalic acid which article upon being treated with a compound containing at least one basic —NH— group becomes dyeable with acid dyes.

We also provide a process for the manufacture of synthetic linear polymer fibres comprising distributing within the fibre at least one ester selected from esters of trichloroacetic acid and oxalic acid in an amount within the range from 0.1 to 10% by weight based on the weight of the fibre.

The ester of trichloroacetic or oxalic acid may be incorporated in the shaped article, for example by diffusing an ester of trichloroacetic acid into a filament, fibre, yarn, fabric, or film. Alternatively the ester of trichloroacetic or oxalic acid may, if sufficiently involatile, be incorporated into the polymer before extrusion or spinning and the blended materials may be extruded or spun. The polymer containing the ester of trichloroacetic or oxalic acid is then treated with the compound or compounds containing basic —NH— groups, which react rapidly with trichloroacetic or oxalic ester linkages, to form amide linkages. In the case where an aromatic polyester such as poly(ethylene terephthalate) is treated, the rate of reaction of compounds containing basic —NH— groups with trichloroacetic or oxalic ester groups is very much faster than their rate of reaction with aromatic ester groups, so that it is possible to react a high proportion of the trichloroacetate or oxalate ester groups before any significant attack on the aromatic polyester chain takes place.

Esters of trichloroacetic and/or oxalic acid which are to be diffused into the polymer are desirably of relatively low molecular weight, such as methyl and ethyl trichloroacetate and dimethyl and diethyl oxalate respectively. Esters of trichloroacetic and oxalic acid which are to be blended with the polymer before spinning are desirably of relatively high molecular weight, such as ethylene bis-trichloroacetate and dilauryl oxalate and preferably derived from alcohols of high thermal stability. In the case of oxalic esters they may be polymeric in nature, such as poly(ethylene oxalate) or poly(neopentylene oxalate).

Compounds containing basic —NH— groups which are suitable for use in developing the acid-dyeability of polymers containing trichloroacetic or oxalic acid esters are desirably of sufficiently low molecular weight to diffuse readily into the polymer. Although compounds containing only one basic —NH— group provide increased acid-dyeability, presumably due to the affinity of acid dyes for amide linkages, the best results are obtained if the compound or compounds used contain more than one basic group, at least one of which is an —NH— group; other basic groups present in the compound need not be —NH— groups, and can be, for example, tertiary amino groups. Compounds which may be used include, for example, ammonia, methylamine, dimethylamine, hydrazine, N,N-dimethyl hydrazine, guanidine, ethylenediamine, hexamethylenediamine, and diethylene triamine.

The following examples illustrate but do not limit our invention.

*Example 1*

A poly(ethylene terephthalate) taffeta fabric was heated in ethyl trichloroacetate at 150° C. for 5 minutes, washed free from surface ester, dipped in hydrazine hydrate for 90 seconds, washed free from surface hydrazine, and dyed in a dyebath containing "Carbolan" Yellow 4G (0.1%) and acetic acid (1%) at the boil for 1 hour. The fabric was dyed deep yellow. ("Carbolan" is a registered trademark.)

*Example 2*

Neopentylene bistrichloroacetate, B.P. 127–9°/0.3 mm., was prepared by ester exchange between ethyl trichloroacetate and neopentylene diol (2,2-dimethyl-1,3-propane diol). The neopentylene diester was mixed with poly(ethylene terephthalate) to give 1% and 5% neopentylene diester in two separate batches. The polymers were then melt-spun at 270° C. and 273° C. respectively through a 3-hole spinneret, and the spun fibres were plied to give a 6-filament yarn and drawn on a hot pin at draw ratios 4.5 and 5.0 at pin temperatures ranging from 50–90° C. The drawn yarn was converted into hanks, and these were immersed in hydrazine hydrate for 30-60 minutes, washed with water, and dyed with "Carbolan"

(registered trademark) Blue BS (C.I. Acid Blue 138) at the boil for 1 hour. The hanks were dyed blue (1% additive) and deep blue (5% additive).

*Example 3*

A poly(ethylene terephthalate) taffeta fabric was heated in dimethyl oxalate at 150° C. for 5 minutes, washed free from surface oxalate, dipped in hydrazine hydrate for 30 seconds, washed free from surface hydrazine, and dyed in a dye-bath containing (0.1%) "Carbolan" Blue BS (registered trademark) and (1%) acetic acid, at the boil for 30 minutes. The fabric was dyed deep blue.

*Example 4*

A poly(ethylene terephthalate) taffeta, fabric was heated in dimethyl oxalate at 150° C. for 5 minutes, washed free from surface oxalate, dipped in 34% ammonia solution for 5 minutes, washed free from surface ammonia, and dyed in a dye-bath containing (0.1%) "Carbolan" Blue BS (registered trademark) and (1%) acetic acid at the boil for 1 hour. The fabric was stained blue.

*Comparative examples.*—For comparison fabrics which had been (a) untreated; (b) dipped in hydrazine hydrate for 30 seconds; (c) dipped in 34% ammonia for 5 minutes, were each dyed under the above conditions for 1 hour except that heating in dimethyl oxalate was omitted. None of the fabrics were either dyed or stained.

*Example 5*

Dilauryl oxalate, B.P. 224° C. at 0.3 mn., was prepared by ester exchange between dimethyl oxalate and lauryl alcohol and purified by distillation at reduced pressure. The product was mixed with poly(ethylene terephthalate) to give 1% and 5% of dilauryl oxalate in two separate batches. The polymers were then melt-spun at 262° C. and 264° C. respectively through a 3-hole spinneret, and the spun fibres were drawn on a hot pin at 85° C. and a hot plate at 115° C. at a draw ratio of 4.0:1. The drawn yarn was converted into hanks, and these were immersed in hydrazine hydrate for 30 seconds, washed with water, and dyed with "Carbolan" Blue BS, registered trademark) at the boil for 1 hour. The hanks were dyed deep blue.

*Example 6*

Poly(neopentylene oxalate) was prepared by ester exchange between dimethyl oxalate and neopentylene glycol. The product was mixed with poly(ethylene terephthalate) to give 1% and 5% of the neopentylene polyester in two separate batches. The polymers were then melt-spun at 268° C. and 274° C. respectively through a 3-hole spinneret, and the spun fibres were drawn to a draw ratio of 3.5:1 at pin temperatures of 70° C. and 90° C. and plate temperatures of 126° C. and 105° C. respectively. The drawn yarn was converted into hanks, and these were immersed in hydrazine hydrate for 30 seconds, washed with water, and dyed with "Carbolan" Blue BS (registered trademark) at the boil for 1 hour. The hanks were dyed deep blue.

*Example 7*

A poly(ethylene terephthalate) taffeta fabric was heated in diethyl oxalate at the boil for 20 minutes, washed free from surface oxalate, dipped in hydrazine hydrate for 90 seconds, washed free from surface hydrazine, and dyed in a dyebath containing 0.1% "Coomassie" Fast Black B (registered trademark) and 1% acetic acid at the boil for 1 hour. The fabric was dyed black.

*Example 8*

A poly(ethylene terephthalate) taffeta fabric was heated in a 30% solution of dimethyl oxalate in chloroform at the boil for 20 minutes, washed free from surface contamination, dipped in hydrazine hydrate for 90 seconds, washed free from surface hydrazine, and dyed in a dyebath containing 0.1% "Carbolan" Yellow 4GS (registered trademark) and 1% acetic acid at the boil for 1 hour. The fabric was dyed yellow.

*Example 9*

Example 6 was repeated except that the hanked yarn was immersed in N,N-dimethyl hydrazine for 5 minutes instead of hydrazine hydrate for 30 seconds. The hanks were dyed blue.

*Example 10*

A mixture of neopentylene bistrichloroacetate (5 parts) and polypropylene (95 parts) was melt-spun at 190° C. through a three-hole spinneret at a throughput of 1.3 g./min., and a wind-up speed of 1000 ft./min. The filaments were drawn at a draw ratio of 4:1 over a pin at 60° C. and a plate at 110° C. The drawn yarn was converted into a hank, and this was immersed in hydrazine hydrate for 30 min., washed with water, and dyed with "Carbolan" Blue BS (C.I. Acid Blue 138) at the boil for 1 hour. The hank was dyed blue.

This example illustrates the applicability of the process to polypropylene yarn.

What we claim is:

1. An acid dyeable meltspun fiber comprising synthetic linear polyester having distributed within it the reaction product of at least one ester selected from the group consisting of alkyl, alkylene and polyalkylene esters of an acid selected from the group consisting of trichloroacetic acid and oxalic acid, with an amine containing at least one member of the group consisting of primary and secondary amines, the amount of said ester being 0.1 to 10% by weight of said fiber.

2. An acid dyeable meltspun fiber as set forth in claim 1 in which said ester is a high boiling ester having a boiling point at atmospheric pressure not less than 40° C. above the melting point of said linear polyester.

3. An acid dyeable meltspun fiber as set forth in claim 2 in which said ester is a polyalkylene ester of oxalic acid and said linear polyester is polyethylene terephthalate.

4. An acid dyeable meltspun fiber as set forth in claim 1 in which said ester is selected from the group consisting of methyl and ethyl esters of oxalic and trichloroacetic acids.

5. An acid dyeable meltspun fibers as set forth in claim 1 in which said amine is selected from the group consisting of ammonia, methylamine, dimethylamine, hydrazine, N,N-dimethyl hydrazine, guanidine, ethylenediamine, hexamethylenediamine, and diethylene triamine.

6. An acid dyeable meltspun fiber comprising polyethylene terephthalate and the reaction product of at least one ester selected from the group consisting of alkyl, alkylene and polyalkylene esters of an acid selected from the group consisting of trichloroacetic acid and oxalic acid, with an amine containing at least one member of the group consisting of primary and secondary amines, the amount of said ester being 0.1 to 10% by weight of said fiber.

7. A process for improving the dye receptivity of fibers which comprises contacting a synthetic linear polyester fiber which contains distributed within it 0.1 to 10% by weight of the fiber of an ester selected from the group consisting of alkyl, alkylene and polyalkylene esters of a member of the group consisting of oxalic and trichloroacetic acids, with an amine containing at least one member of the group consisting of primary and secondary amines, said ester being more reactive with said amine than said polyester.

8. A process as set forth in claim 7 in which the fiber containing said ester is produced by melt spinning a mixture of said polyester and said ester.

9. A process as set forth in claim 7 in which the fiber containing said ester is produced by contacting pre-formed polyester fiber with said ester.

(References on following page)

References Cited by the Examiner

UNITED STATES PATENTS

| | | | |
|---|---|---|---|
| 2,945,010 | 7/1960 | Caldwell et al. | 260—75 |
| 3,112,159 | 11/1963 | Cappuccio et al. | 8—55 |
| 3,154,374 | 10/1964 | Gruschke et al. | 8—130.1 |
| 3,223,752 | 12/1965 | Tate et al. | 260—873 |

FOREIGN PATENTS

| | | |
|---|---|---|
| 1,303,888 | 8/1962 | France. |
| 748,944 | 5/1956 | Great Britain. |
| 828,924 | 2/1960 | Great Britain. |

MURRAY TILLMAN, *Primary Examiner.*

J. T. GOOLKASIAN, *Assistant Examiner.*